Figure 1:
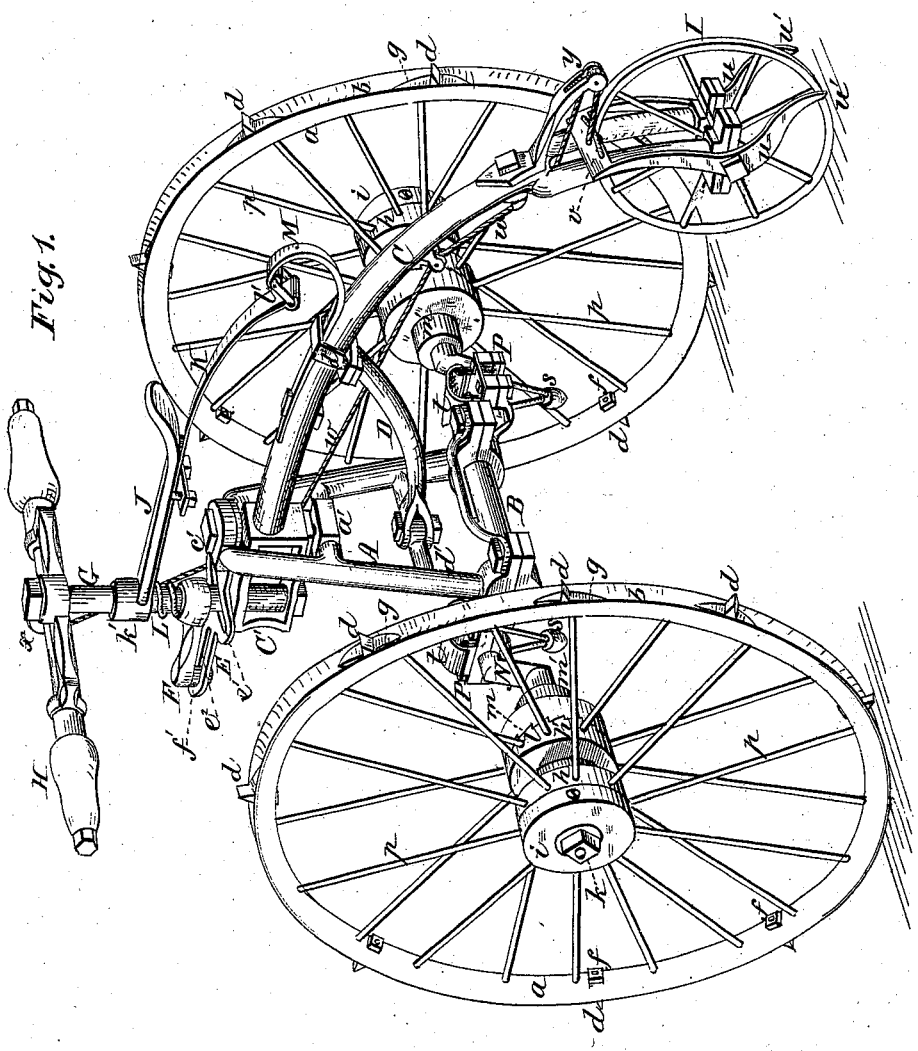

(No Model.)  3 Sheets—Sheet 1.

F. FOWLER.
Tricycle

No. 227,511.  Patented May 11, 1880.

Attest,
W. N. N. Knight
Floyd Norris

Inventor,
Francis Fowler
by Johnson & Johnson
Atty (No Model.)  3 Sheets—Sheet 2.
F. FOWLER.
Tricycle
No. 227,511. Patented May 11, 1880.
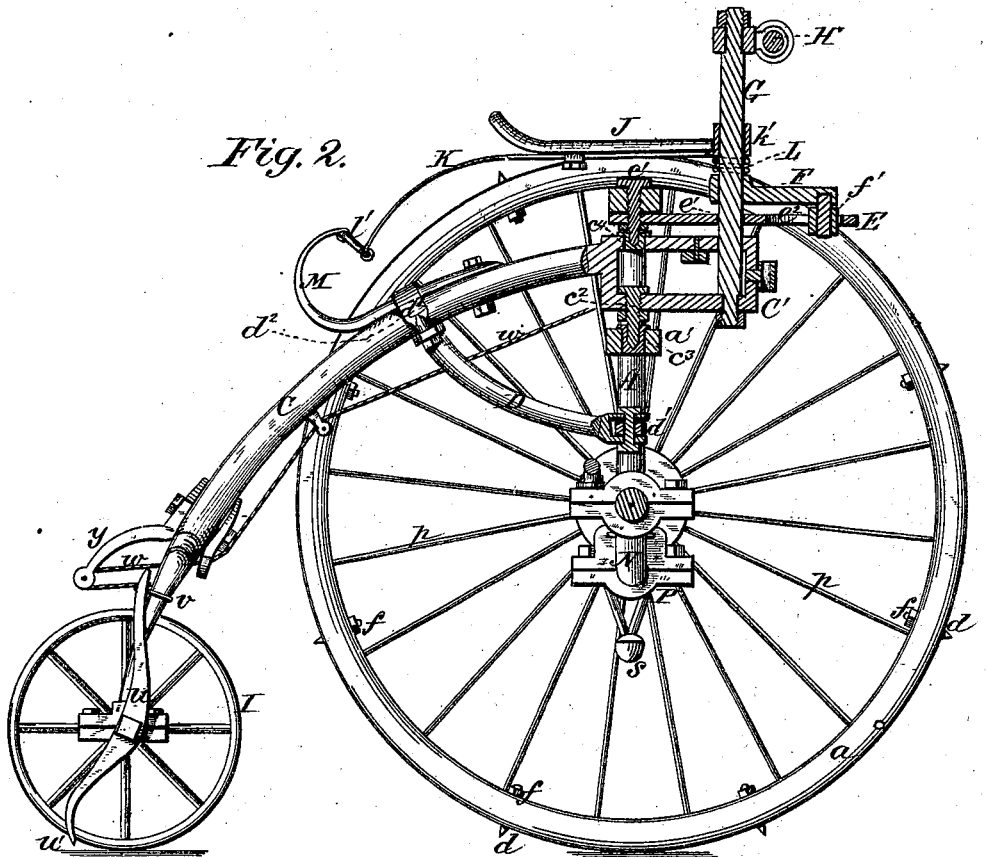
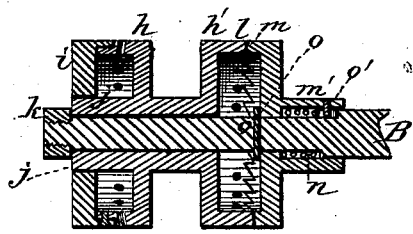
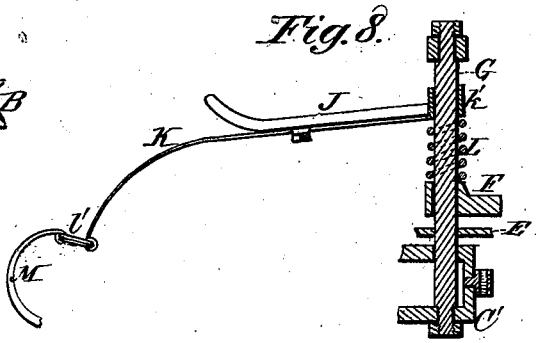
Attest,
W. H. H. Knight
Floyd Norris
Inventor,
Francis Fowler
by Johnson & Johnson
Attys

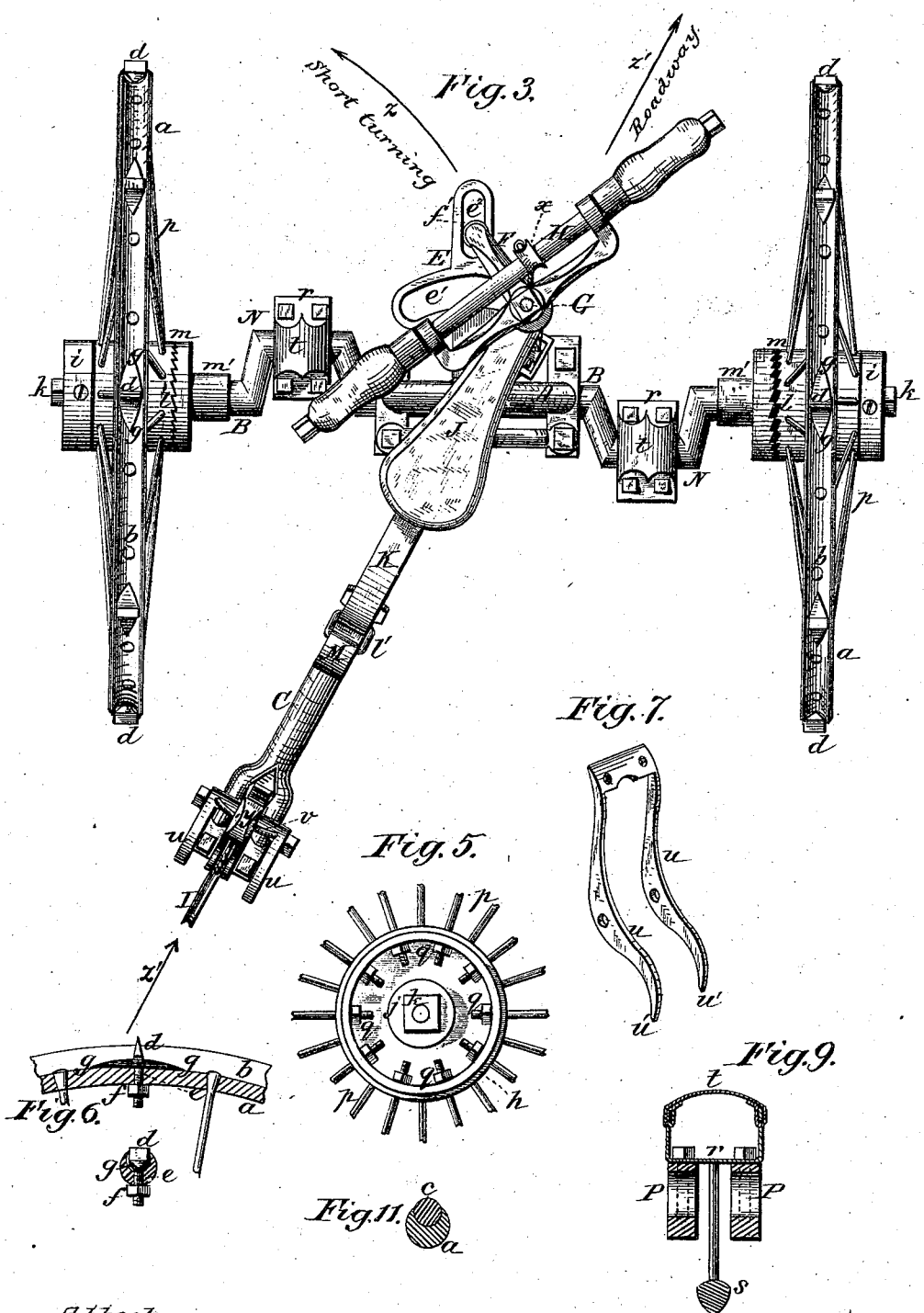

UNITED STATES PATENT OFFICE.

FRANCIS FOWLER, OF NEW HAVEN, CONNECTICUT.

TRICYCLE.

SPECIFICATION forming part of Letters Patent No. 227,511, dated May 11, 1880.

Application filed March 8, 1880. (No model.)

*To all whom it may concern:*

Be it known that I, FRANCIS FOWLER, of New Haven, in the county of New Haven and State of Connecticut, have invented certain new and useful Improvements in Tricycles, which I denominate "The American Roadster," of which the following is a specification.

My invention relates to improvements in tricycles in which the curved or sloping reach of the bicycle is used and in which the front wheels form both the driven and the steering wheels; and the objects of my improvements are to provide means to more easily and quickly effect the guiding of the front driven wheels; to adapt the saddle for vertical adjustment to suit riders having different lengths of limb with effective action upon the foot-rests of the crank-axle; to obtain a durable pivotal connection of the yoke-frame with the reach, in connection with a free lever action upon the yoke-frame, and upon the reach in front of said yoke-frame to facilitate the steering of the traction-wheels; to render the driven wheels and their ratchet-connections with the crank-axles more effective as supporting and steering wheels; and to afford facilities by which the tricycle can be adapted for use upon land and upon ice without affecting the organization of the tricycle as such. I attain these objects by the construction shown in the accompanying drawings, in which—

Figure 1 represents a view, in perspective, of the tricycle as adapted for ice travel; Fig. 2, a vertical section taken on a line at right angles to the crank-axle and through the adjustable pivot-bearings of the reach; Fig. 3, a top view, showing the front driven wheels in position for turning short, the arrow Z indicating such turn and the arrow Z' the line of the road; Fig. 4, a section through one of the driven-wheel hubs; Fig. 5, an end view of the hub with the outer cap removed; Fig. 6, one of the chisel-blades of the driven wheels; Fig. 7, the claw-brake of the reach-supporting wheel; Fig. 8, a sectional view, showing the seat adjusted to a high position upon the steering-post; Fig. 9, a section of one of the foot-rests of the crank-axle; Fig. 10, one of the adjustable steel pivot-bearings of the reach; and Fig. 11, a section of the wheel-rim, showing the rubber tire for land travel.

The driving and steering wheels are secured upon the ends of the crank-axle, and a small wheel supports the reach, which is of a curved form, called the "backbone," while the reach-supporting yoke-frame is mounted upon the axle between the crank foot-rests; and in these particulars the tricycle is the same as that patented to me Februrary 3, 1880, and it is to such a tricycle that my present improvements relate.

The wheels are driven by the crank-axle by means of the foot-rests upon the cranks, and, in order to allow the tricycle to make a short turn upon the front wheels, they are fitted loosely upon said axles. These wheels are adapted for travel upon land and upon ice, and their several parts are of metal, the rim or rolling part $a$ being formed with an outside deep circumferential groove, $b$, to receive the usual cylindrical rubber tire $c$, Fig. 11, for land travel, and which is made removable in order that steel chisel-blades $d$ may be fitted within said groove so as to project beyond the circumference of the wheel and at suitable distances apart. These chisel-blades have their edges standing crosswise of the groove, and are equal in width thereto, so as to give a firm hold in the ice as contradistinguished from a mere point. They are formed with screw-shanks $e$, Fig. 6, which, passing through perforations in the bottom of the groove, are secured by nuts $f$ on the inner side of the said grooved rim, the base of the chisel-blade being formed with projecting wings $g$, which, lying within the groove and upon its bed, serve to brace the chisel-blades firmly in their seats. They are easily removable to replace the rubber tire.

The hub, Fig. 4, is formed of two hollow heads, $h\ h'$, with an intervening recess for lightness, the outer head, $h$, being provided with a cap, $i$, which fits over a rabbeted rim on the outer hollow side of said head, and to which rabbeted rim the cap is secured by screw-bolts. The cap is also fitted over a central projection, $j$, which passes through a central opening in said cap, and besides giving a long bearing for the wheel, and thereby greater steadiness of motion, forms an end bearing for the nut $k$, which, being screwed upon the screw end of the axle, confines the wheel thereon and turns with the axle and wheel, so that the wheel-confining nuts are not liable to come off. The inner hollow head, $h'$, has ratchet-teeth $l$ formed on its inner circular edge, which matches with a corresponding ratchet, $m$, formed on a head, from which a sleeve, $m'$, projects inward upon the axle. Within this sleeve a spiral spring, $n$, Fig. 4, is placed around the axle, so as to bear upon a shoulder thereon and a shoulder on the interior of the sleeve and constantly press the sleeved ratchet-head $m$ in position to make a close engagement with the ratchet-head of the hub, but not to press against it, being prevented from such pressure by a stop-pin, $o$, passing through the axle, and against which the hollow face of said sleeved ratchet-head presses. This sleeved ratchet-head is therefore free to be pressed inward upon the axle by the action of the wheel to allow the latter to revolve independently of said axle in making short turns; but this sleeved ratchet-head is prevented from turning upon the shaft by a stud, $o'$, projecting from the inner side of said sleeve into a groove in the shouldered part of the axle. This relieving of the wheels from the pressure of the sleeved ratchet-heads is important in preventing pressure upon the axle-nuts when the shaft and wheels are being driven together.

The spokes $p$ are of wrought-iron rods, and are arranged in two series, the inner ends of one series passing through perforations in the inner hollow ratchet hub-head, $h'$, and the outer series passing through perforations in the outer hollow hub-head, $h$, so as to give the spokes an extended base or hub connection. These spokes terminate in screw ends within the hub-heads, and are secured by nuts $q$, Fig. 5, so that these nuts are covered and inclosed by the cap $i$ of the outer hub-head and by the inner sleeved ratchet-head, excluding dust therefrom. This arrangement, besides strengthening the wheel against lateral strain, serves the more important purpose of suspending the crank-axle and the rider by the upper spokes and relieving the under spokes from all unnecessary vibration.

The perforations in the grooved part of the treading-rim of the wheel are made flaring outward, so as to hold the ends of the spokes, which have conical heads to fit these perforations.

The reach-supporting yoke-frame A is mounted by suitable boxes centrally upon the crank-axle B, and its lower ends are braced by one or more cross-bars.

The upper end of the curved reach C extends through the upper part of said yoke-frame, and is pivoted thereto, between its top and a cross-bar, $a'$, by steel-pointed screw-bolts, upon which the said yoke-frame turns to guide the driven wheels.

The pivoted ends of the reach terminate in an open lever part, $C'$, which extends in front of the yoke-frame, and it is within the upper and lower plates of this open part that the reach pivot-bolts $c'$ $c^2$ are secured. The lower one, $c^2$, Figs. 2 and 10, of these pivot-bolts is screwed into and through the lower plate, and has its bearing in a steel step or socket, $c^3$, secured in the cross-bar $a'$, while the upper pivot-bolt, $c'$, is screwed into and through the top of the yoke-frame and into a steel step or socket, $c^4$, in the upper plate of the open reach end. While these pivot-bolts connect the reach and yoke, yet the strain and concussions upon the reach are borne principally by a curved brace, D, pivoted to a cross-bar, $d'$, of the yoke, and firmly connected to the reach by a clip, $d^2$, at a point back of the saddle, so that the weight of the rider and the force of concussions upon the reach are borne by the lower bearing-bolt, $c^2$, and this upwardly-curved brace. This brace relieves the pivot-bolts from injury, prevents the danger of snapping the backbone, and transfers the force of the concussions to the yoke-frame at a point between the pivot-bolts and the crank-axle, or near said axle. This construction gives three pivoted bearing-points for the reach upon the yoke-frame, two of which are adjustable in the yoke-frame to maintain their proper bearing with the reach, and these pivot-bolts fit with pointed ends within the steel steps to give the easiest action in guiding the front driven wheels, which guiding is effected by a construction specially designed to turn quickly and with the least power. For this purpose the open end $C'$ of the reach, which extends in front of the yoke-frame, is utilized as a lever, the fulcrum of which is formed by the pivot-bolts, and is connected with the top of the yoke-frame by a strong lever-arm, E, through a lever or crank arm, F, of the steering-post G, which is supported at the front end of the reach, and rises through a slot, $c'$, formed in the lever-arm E, concentric with the reach pivot-bolts. This lever-arm E extends horizontally over the open end $C'$ of the reach, and is provided with a radial slot, $c^2$, within which is fitted an anti-friction roll, $f'$, on the end of the lever or crank arm, F, which latter extends frontward from the steering-post above the yoke-frame lever-arm. This construction gives in effect the action of three levers, by which the steering-post effects the guiding of the driven wheels, and in which the united action of the steering-post lever or crank F, the yoke-lever arm E, and the reach-extension or open end $C'$ co-operate to bring the steering of the front wheels within easy and immediate control of the rider.

The double-handle steering-bar H is secured upon the top of the post G, and in turning it to the right or to the left the lever-crank F, acting by its roll $f'$ within the radial slot $c^2$ of the lever-arm E of the yoke, will cause the latter to be vibrated accordingly over the steering-post by reason of the concentric slot $e'$, and the front wheels will thus be caused to make a short turn, if desired, and in which the outer wheel will slip upon the crank-axle by reason of the ratchet-connection, thus allowing of quick turning while under high speed, as shown in Fig. 3. In this action the reach is supported by its small wheel I, which may co-operate to a certain extent in guiding the machine under the action of the reach through its open end or lever part C′, and in which co-operation the said reach-lever part C′ would be carried in a direction opposite to that of the yoke-lever arm E, as shown in Fig. 3; but it is obvious that the united lever action which I have described renders comparatively easy the steering of a tricycle in which the front driven wheels serve also as the steering-wheels.

The saddle J is secured upon a long plate-spring, K, the front end of which terminates in a short sleeve, $k'$, Figs. 1, 2, and 8, which embraces the steering-post G, and rests upon a coiled or rubber spring, L, placed upon said post and supported upon a shoulder formed by the lever-crank F, so as to bring the seat and the position of the rider centrally over the yoke-frame, and consequently directly over the crank-axle, bringing his weight in vertical line therewith, and thereby obtaining, to the fullest extent, the advantage of the highest speed in a tricycle in which the front wheels are mounted upon a crank-axle driven by the action of the rider's feet upon oppositely-arranged cranks provided with foot-rests.

The rear end of the saddle-spring is connected by means of a link, $l'$, to an upwardly-curved hanger, M, secured to the reach by a screw-bolt and the clip $d^2$, Fig. 2, which, embracing both the hanger and the reach, is secured to the upper end of the curved reach-brace D, and thus these three parts are firmly bound together by the same clip. This construction gives the advantage of a vertically-adjustable saddle to suit riders having limbs of different length, and gives full action upon the foot-rests. This adaptation for long or short limbs is obtained by the manner in which the saddle-spring is connected to the steering-post to allow the saddle to be raised or lowered upon the steering-post and supported upon a longer or shorter spring, Figs. 2 and 8, which may be changed by removing the steering-bar and lifting the sleeved end $k'$ of the saddle-spring off the post, when a spring of the proper length can be put upon the post and the saddle-spring and steering-bar replaced. For this purpose the steering-post must be of a length sufficient to allow the saddle-spring to be supported at a point thereon to suit the sweep of the crank foot-rests and the length of the rider's limbs. This feature of my invention can be applied to any velocipede in which the wheels are operated by foot-rests upon a crank-axle between front driving-wheels.

The foot-rests are secured upon the cranks N by suitable boxes P, connected by a top plate, $r$, Fig. 9, so as to support the feet above the cranks, and these foot-rests are provided with pendent weights or balls $s$, by which to keep them always in position to receive the rider's feet. They are also provided with leather lifts $t$, by which the rider may use his feet both by pressure and upward pulling.

In adapting the tricycle for use upon ice a brake is applied to the axle of the reach-supporting wheel, so as to act with claws upon the ice in rear of said wheel. It is formed of two arms, $u$, curved to form claw-points $u'$, and joined at their upper ends over the wheel and at the rear side of the divided end of the reach with the arms pivoted on each end of the short axle, and therefore at each side of the wheel.

In the normal position of the brake its claw-points are held up by a spring or springs, $v$, Fig. 2, connecting the joined ends of the arms with the reach, against which the said arms rest at a point above the wheel.

A cord, $w$, connects the top of the brake with a spool, $x$, upon the steering-bar H, which is adapted to be turned in its bearings to wind and release the cord, which passes over rolls on the under side of the reach and on a bracket, $y$, projecting therefrom over and back of the connected ends of the claw-arms, so that the winding of the cord pulls out the top of the brake and depresses the claw-points into the ice on each side of the wheel. Placing the claw-points on each side of the reach-supporting wheel and joining them at the top, so that both the claws act at once, renders the brake very effective. Its attachment to the axle of the wheel renders it easily removable, and the joining of the claw-arms forms a bearing upon the reach when the brake is not used.

For land travel a wheel-brake may be applied in my said patent.

The rider sits upright upon the saddle, with the tiller-bar H in front, by which he guides the machine and controls the brake while driving the front wheels by treadle action upon the crank foot-rests.

By this construction the yoke-frame and the reach are connected near the axle, and are adapted for free action thereon, and they stand below the tops of the front wheels, thereby lessening, to a great extent, the liability of the reach being thrown over when under high speed by the striking of the reach-wheel upon a stone or from other cause.

In using the tricycle for ice travel the circumferential rubber tire $c$ of the reach-supporting wheel is removed, leaving a double-edged rolling tread like the gutter of a skate. The front driven wheels will also have such edge rolling treads, which, in connection with the chisel-blades, give the required traction upon the hard smooth surface of the ice. The seat extends forward of the yoke-frame, so as to allow the rider to sit forward of the propelling-axle in ascending hills, in which position the rear wheel will be relieved of much friction and render the ascent less laborious.

I claim—

1. The combination, in a tricycle, of the yoke-frame supported upon the crank-axle between the driven wheels, and the curved reach supported by a rear wheel, with the adjustable pivot-bolts $c'$ $c^2$ in the yoke and in the reach, and their step-bearings $c^3$ $c^4$, forming the pivot-bearings for the reach, substantially as and for the purpose herein set forth.

2. In a tricycle, the combination of the yoke-frame supported upon the crank-axle between the driven wheels, and the curved reach supported by a rear wheel, with the adjustable pivot-bolts $c'$ $c^2$ and the curved brace D for said reach pivoted to the yoke-frame in vertical line with the said pivot-bearings, substantially as and for the purpose set forth.

3. The combination, in a tricycle, of the yoke-frame and the reach pivoted thereto and projecting in front thereof with the steering-post G, provided with a crank-lever arm, F, and the front projecting yoke-lever arm, E, having a free connection with said yoke-lever arm, whereby the steering of the front driven wheels is effected through the united and co-operating lever action of the steering-post, the pivoted reach, and the yoke-frame, substantially as herein set forth.

4. The combination of the yoke-frame, the reach pivoted thereto, and the steering-post carried by the reach in front of its pivots, substantially as described, with the frontward-projecting yoke-lever arm E, provided with the radial slot $c^2$ and the segmental slot $c'$, and the frontward-projecting post-lever arm F, the said post and its lever-arm having a free connection with said yoke-lever arm E through said slots, substantially as and for the purpose herein set forth.

5. The combination of the reach pivoted to the yoke-frame A and extending in front thereof, substantially as described, with the steering-post G, having a free lever-connection with said yoke-frame and with the reach C, and operating to guide the front driven wheels through the yoke-frame and the reach, substantially as herein set forth.

6. The combination of the driven wheels, operated by a crank-shaft by foot-rests thereon, with a vertically-adjustable saddle-support, K, having a free sleeved connection, $k'$, with the steering-post G, and resting upon a spring, L, thereon, whereby the saddle may be adjusted upon said post in relation to the foot-pads to suit the length of the rider's limbs, substantially as herein set forth.

7. The combination of the steering-post G, arranged in front of the yoke-frame A, and connected therewith and to the pivoted reach C, substantially as herein set forth, with the saddle J, extending over said yoke-frame and over the pivot-bearings $c'$ $c^2$ of said reach, and supported upon a spring, L, upon said post, whereby the weight of the rider is brought directly over or forward of the crank-axle of the driven wheels, substantially as herein set forth.

8. The combination of the reach pivoted to the yoke-frame and carrying the steering-post in front thereof, substantially as herein described, with the saddle-supporting spring K, connected to said post by a free sleeve-bearing, $k'$, and to the reach by the link $l'$ and hanger M, substantially as herein set forth.

9. The combination, in a tricycle, of the yoke-frame supported upon the crank-shaft between the driven wheels, and the curved reach supported by a rear wheel, with the sleeved heads $m$ $m'$, the springs $n$, the stop-pins $o$, the studs $o'$, and the ratchet-wheel hub-heads $h$ $h'$, whereby the said wheels are relieved from the pressure of the driving ratchet-heads and the outer wheel allowed to turn short independently of the axle, substantially as described.

10. The combination, in a tricycle, of the driven and steering wheels loose upon the crank-axle, and having hollow hub-heads $h$ $h'$, the inner one of which is provided with ratchet-teeth $l$, with the sleeved ratchet-heads $m$ $m'$, having only a sliding movement upon said axle, the outer hub-head being provided with a cap, $i$, and a centrally-projecting hub part, $j$, passing through said cap and forming the bearing for the axle-nut $k$, the spokes of said wheels being secured by the nuts $g$ within the hollow hub-heads, all substantially as and for the purpose herein set forth.

11. The combination of the front wheels provided with circumferential grooves for rubber tires for land travel, and which are operated by foot-rests upon a crank-axle, with removable chisel-blades $d$, having side bracing-wings, $g$, clamped within and upon the bottom of said grooves, the said chisel-blades being arranged across said grooves, substantially as and for the purpose set forth.

12. A tricycle constructed with front wheels provided with circumferential grooves for rubber tires for land travel, and which are operated by foot-rests upon a crank-shaft, the chisel-blades $d$, removably clamped and braced within said grooves, and the claw-arms $u$ $u'$, pivoted upon the axle of the reach-supporting wheel, substantially as and for the purpose herein set forth.

In testimony whereof I have hereunto set my hand.

FRANCIS FOWLER.

Witnesses:
FRANK C. SURF,
GEO. A. ISBELL.